United States Patent
Yoshida et al.

(10) Patent No.: US 12,493,534 B2
(45) Date of Patent: Dec. 9, 2025

(54) PRIMARY MACHINE AND FAULT-TOLERANT SYSTEM

(71) Applicant: Yokogawa Electric Corporation, Musashino (JP)

(72) Inventors: Yoshitaka Yoshida, Musashino (JP); Takeshi Toinaga, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 73 days.

(21) Appl. No.: 18/237,092

(22) Filed: Aug. 23, 2023

(65) Prior Publication Data

US 2024/0111641 A1    Apr. 4, 2024

(30) Foreign Application Priority Data

Sep. 30, 2022   (JP) ................ 2022-158954

(51) Int. Cl.
   *G06F 11/00*   (2006.01)
   *G06F 9/455*   (2018.01)
   *G06F 11/16*   (2006.01)

(52) U.S. Cl.
   CPC ...... *G06F 11/1683* (2013.01); *G06F 9/45558* (2013.01); *G06F 2009/4557* (2013.01); *G06F 2009/45591* (2013.01); *G06F 2201/815* (2013.01)

(58) Field of Classification Search
   None
   See application file for complete search history.

(56) References Cited

U.S. PATENT DOCUMENTS

| | | | |
|---|---|---|---|
| 6,601,186 B1 | 7/2003 | Fox et al. | |
| 6,996,751 B2* | 2/2006 | Harper | G06F 11/079 714/48 |
| 2008/0256384 A1 | 10/2008 | Branson et al. | |
| 2010/0325471 A1* | 12/2010 | Mishra | G06F 11/1484 718/1 |
| 2014/0082408 A1 | 3/2014 | Yoshida et al. | |
| 2014/0082617 A1 | 3/2014 | Yoshida et al. | |
| 2014/0082618 A1 | 3/2014 | Yoshida et al. | |
| 2014/0082619 A1 | 3/2014 | Yoshida et al. | |

(Continued)

FOREIGN PATENT DOCUMENTS

| | | |
|---|---|---|
| JP | H06266574 A | 9/1994 |
| JP | 2012077235 A | 4/2012 |

(Continued)

OTHER PUBLICATIONS

Google Scholar/Patents search—text refined (Year: 2024).*

(Continued)

*Primary Examiner* — Christopher S McCarthy
(74) *Attorney, Agent, or Firm* — WHDA, LLP

(57) ABSTRACT

A primary machine includes a primary virtual machine including a synchronization information generator configured to generate and output synchronization information based on an instruction and a result of execution of the instruction, and a fault selector configured to determine a type of fault information generated when the instruction was executed. The primary VM changes operation depending on a result of the determination of the type of fault information.

15 Claims, 4 Drawing Sheets

(56) References Cited

U.S. PATENT DOCUMENTS

| | | | | |
|---|---|---|---|---|
| 2016/0147587 A1* | 5/2016 | An | ................. | G06F 11/079 |
| | | | | 714/37 |
| 2016/0328302 A1* | 11/2016 | Bissett | ................. | G06F 11/3006 |
| 2021/0303492 A1 | 9/2021 | Yoshida | | |

FOREIGN PATENT DOCUMENTS

| | | | |
|---|---|---|---|
| JP | 2014059747 | A | 4/2014 |
| JP | 2014059748 | A | 4/2014 |
| JP | 2014059749 | A | 4/2014 |
| JP | 2014059750 | A | 4/2014 |
| JP | 2019109735 | A | 7/2019 |
| JP | 2021-152802 | A | 9/2021 |
| KR | 10-2014-0140719 | A | 12/2014 |

OTHER PUBLICATIONS

Google Scholar/Patents search—text refined (Year: 2025).*
Office Action dated Jul. 23, 2024, issued in counterpart JP Application No. 2022-158954, with English translation. (8 pages).
Extended European Search Report dated Feb. 19, 2024, issued in couterpart EP Application No. 23195459.5. (8 pages).
Office Action dated Mar. 18, 2025, issued in counterpart JP Application No. 2022-158954, with English translation. (6 pages).

* cited by examiner

PRIMARY MACHINE AND FAULT-TOLERANT SYSTEM

CROSS-REFERENCE TO RELATED APPLICATION

The present application claims priority to and the benefit of Japanese Patent Application No. 2022-158954 filed Sep. 30, 2022, the entire contents of which are incorporated herein by reference.

TECHNICAL FIELD

The present disclosure relates to a primary machine and a fault-tolerant system.

BACKGROUND

Conventional fault-tolerant systems capable of operating at low loads are known (see, for example, Patent Literature (PTL) 1).

CITATION LIST

Patent Literature

PTL 1: JP 2021-152802 A

SUMMARY

According to at least one embodiment, a primary machine comprises a primary virtual machine including a synchronization information generator configured to generate and output synchronization information based on an instruction and a result of execution of the instruction, and a fault selector configured to determine a type of fault information generated when the instruction was executed. The primary virtual machine changes operation based on a result of the determination of the type of fault information.

According to at least one embodiment, a fault-tolerant system comprises: the primary machine according to any one of (1) to (4) above; and a secondary machine including a secondary virtual machine configured to execute the instruction based on the synchronization information.

DETAILED DESCRIPTION

Figure 1:
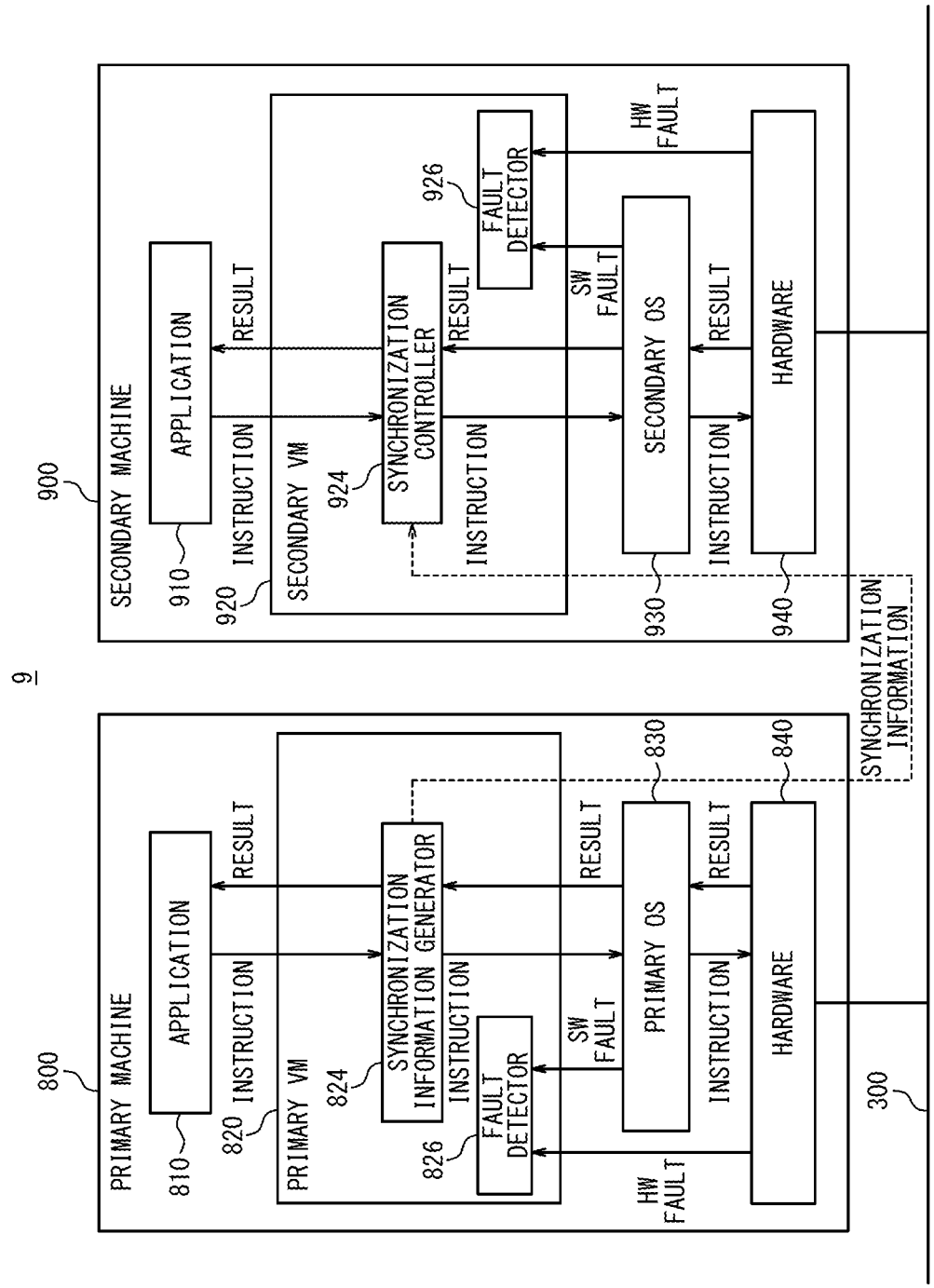
FIG. 1 is a block diagram illustrating a fault-tolerant system according to a comparative example.

In a fault-tolerant system, when a fault occurring in a primary machine is not resolved by switching control to a secondary machine, the primary machine must resolve the fault without switching control. It is desirable to switch control only when necessary, without automatically switching control when a fault occurs. It would be helpful to provide a primary machine and a fault-tolerant system that determine control switching according to the type of fault.

(1) According to at least one embodiment, a primary machine comprises a primary virtual machine including a synchronization information generator configured to generate and output synchronization information based on an instruction and a result of execution of the instruction, and a fault selector configured to determine a type of fault information generated when the instruction was executed. The primary virtual machine changes operation based on a result of the determination of the type of fault information. In this way, unnecessary switching is avoided when, for example, an error has occurred that is not resolved by switching control. As a result, control switching is determined by the type of fault.

(2) The primary machine according to (1) above may be configured such that the fault selector determines whether the fault information relates to a hardware fault or a software fault. When the fault information relates to a software fault, the primary virtual machine executes at least one of determining that error handling is to be executed by an application running on the primary virtual machine and instructing the application to execute the error handling. In this way, a fault is resolved without switching control. As a result, unnecessary control switching is avoided.

(3) The primary machine according to (2) above may be configured such that the fault selector determines a degree of certainty of the determination of whether the fault information relates to a hardware fault or a software fault. The primary virtual machine changes operation based further on the degree of certainty of the determination. In this way, the accuracy of the determination to switch control is improved. As a result, unnecessary control switching is avoided.

(4) The primary machine according to (2) or (3) above may be configured such that the fault selector obtains a return value or error content of a system call as the fault information. The fault selector determines whether the fault information relates to a hardware fault or a software fault based on a list that identifies whether the return value or error content of the system call corresponds to a hardware fault or a software fault. In this way, the type of fault may be determined easily. As a result, control switching is determined by the type of fault.

(5) According to at least one embodiment, a fault-tolerant system comprises: the primary machine according to any one of (1) to (4) above; and a secondary machine including a secondary virtual machine configured to execute the instruction based on the synchronization information. In this way, operation will continue on the secondary machine even when a fault has occurred in the primary machine. As a result, processing continues for the fault-tolerant system overall.

(6) The fault-tolerant system according to (5) above may be configured such that the fault selector determines whether the fault information relates to a hardware fault or a software fault. The primary virtual machine switches control to the secondary virtual machine when the fault information is determined to be information relating to a hardware fault. The primary virtual machine does not switch control to the secondary virtual machine when the fault information is determined to be information relating to a software fault. In this way, unnecessary switching is avoided when, for example, an error has occurred that is not resolved by switching control. As a result, control switching is determined by the type of fault.

(7) The fault-tolerant system according to (6) above may be configured such that the fault selector determines a degree of certainty of the determination of whether the fault information relates to a hardware fault or a software fault. The primary virtual machine determines whether to switch control to the secondary virtual machine based further on the degree of certainty of the determination. In this way, the accuracy of the determination to switch control is improved. As a result, unnecessary control switching is avoided.

The present disclosure provides a primary machine and a fault-tolerant system in which control switching is determined by the type of fault.

Comparative Example

As illustrated in FIG. 1, a fault-tolerant system 9 according to a comparative example includes a primary machine 800 and a secondary machine 900. The primary machine 800 and the secondary machine 900 are communicatively connected via a network 300. The primary machine 800 and the secondary machine 900 both execute the same processing. When a fault has occurred in the primary machine 800, the secondary machine 900 takes over processing. In this way, processing continues for the fault-tolerant system 9 overall.

The primary machine 800 includes hardware 840 and runs a primary operating system (OS) 830 or hypervisor on the hardware 840. The primary machine 800 runs a primary virtual machine (VM) 820 on the primary OS 830 or on the hypervisor. The primary VM 820 includes a synchronization information generator 824 and a fault detector 826. The primary machine 800 runs an application 810 on the primary VM 820.

The secondary machine 900 includes hardware 940 and runs a secondary OS 930 or hypervisor on the hardware 940. The secondary machine 900 runs a secondary VM 920 on the secondary OS 930 or on the hypervisor. The secondary VM 920 includes a synchronization controller 924 and a fault detector 926. The secondary machine 900 runs an application 910 on the secondary VM 920.

The primary machine 800 and the secondary machine 900 run the application 810 and the application 910 so that the processing of the application 810 and the application 910 is the same processing. In this way, when a fault has occurred in the primary machine 800, the secondary machine 900 is able to take over processing. When not distinguishing between the application 810 and the application 910, each may be referred to simply as an application.

The hardware 840 includes a central processing unit (CPU), memory, and network interface controller (NIC). The hardware 940 includes a CPU, memory, and NIC. When not distinguishing between the hardware 840 and the hardware 940, each may be referred to simply as hardware.

Each CPU may be configured as one or more processors. Each processor may realize various functions by executing a defined program. Each processor may retrieve a program from memory or from the network 300.

The memory may be configured as a semiconductor memory, for example, and may be configured as a storage medium such as a magnetic disk. The memory may function as work memory of the CPU. The memory may be included in the CPU.

The NIC may include a communication interface such as a local area network (LAN).

The primary VM 820 includes a synchronization information generator 824 and a fault detector 826. The synchronization information generator 824 generates synchronization information to communicate the execution status of the application 810 in the primary VM 820 to the secondary VM 920. The fault detector 826 detects a hardware fault (HW fault) occurring in the hardware 840 and a software fault (SW fault) occurring in the primary OS 830.

The secondary VM 920 includes the synchronization controller 924 and the fault detector 926. The synchronization controller 924 receives synchronization information from the primary VM 820 and executes the application 910 in synchronization with the execution status of the application 810 in the primary VM 820. The fault detector 926 detects a hardware fault (HW fault) occurring in the hardware 940 and a software fault (SW fault) occurring in the secondary OS 930.

The primary VM 820 runs on the primary OS 830. The secondary VM 920 runs on the secondary OS 930. The functions of the primary OS 830 are realized by the hardware 840. The functions of the secondary OS 930 are realized by the hardware 940. The primary OS 830 causes the primary VM 820 to execute the processing of the application 810. The secondary OS 930 causes the secondary VM 920 to execute the processing of the application 910.

An example of the flow of operations when an application executes an instruction until an operation result is obtained is described below. In the primary machine 800, the application 810 outputs the instruction to the primary VM 820. The primary OS 830 running the primary VM 820 receives the instruction from the primary VM 820. The primary OS 830 converts the received instruction into a format that is executable by the hardware 840, causes the hardware 840 to execute the instruction, and obtains an operation result of the hardware 840 operation. The primary VM 820 outputs the operation result obtained by the primary OS 830 to the application 810. The above operations allow the application 810 to obtain the operation result according to the instruction.

In the primary machine 800, the synchronization information generator 824 of the primary VM 820 generates synchronization information including the instruction and the operation result and outputs to the synchronization controller 924 of the secondary machine 900. In the secondary machine 900, the application 910 outputs the instruction to the secondary VM 920 based on the synchronization information obtained by the synchronization controller 924. The secondary OS 930 running the secondary VM 920 receives the instruction from the secondary VM 920. The secondary OS 930 converts the received instruction into a format that is executable by the hardware 940, causes the hardware 940 to execute the instruction, and obtains an operation result of the hardware 940 operation. The secondary VM 920 outputs the operation result obtained by the secondary OS 930 to the application 910. The above operations allow the application 910 in the secondary machine 900 to execute the same instruction as the application 810 in the primary machine 800, based on synchronization information, and obtain the operation result.

In the primary machine 800, the primary VM 820 detects, via the fault detector 826, a hardware fault occurring in the hardware 840 and a software fault occurring in the primary OS 830. Similarly, in the secondary machine 900, the secondary VM 920 detects, via the fault detector 926, a hardware fault occurring in the hardware 940 and a software fault occurring in the secondary OS 930.

The fault-tolerant system 9 according to the comparative example switches control to the secondary machine 900 when a fault has occurred in the primary machine 800, regardless of whether the fault is a hardware or software fault. When the fault that occurred was a hardware fault, the same hardware fault occurring in the secondary machine 900 is unlikely. Thus, the fault-tolerant system 9 is able to avoid a fault in the primary machine 800 and continue to operate overall by switching control to the secondary machine 900.

On the other hand, when the fault that has occurred is a software fault, the same software fault is likely to occur in the secondary machine 900, because the secondary machine 900 is executing the same processing as the primary machine 800. Therefore, the fault-tolerant system 9 may be unable to avoid a fault even when control is switched to the secondary machine 900. When a software fault has occurred, the primary machine 800 of the fault-tolerant system 9 needs to resolve the fault with the application 810 without switching control. In other words, according to the fault-tolerant system 9 and the primary machine 800, control switching is not necessarily determined according to the type of fault.

Therefore, the present disclosure describes a primary machine 100 (see FIG. 2) and a fault-tolerant system 1 (see FIG. 2) where control switching is determined according to the type of fault.

Embodiments

Figure 2:
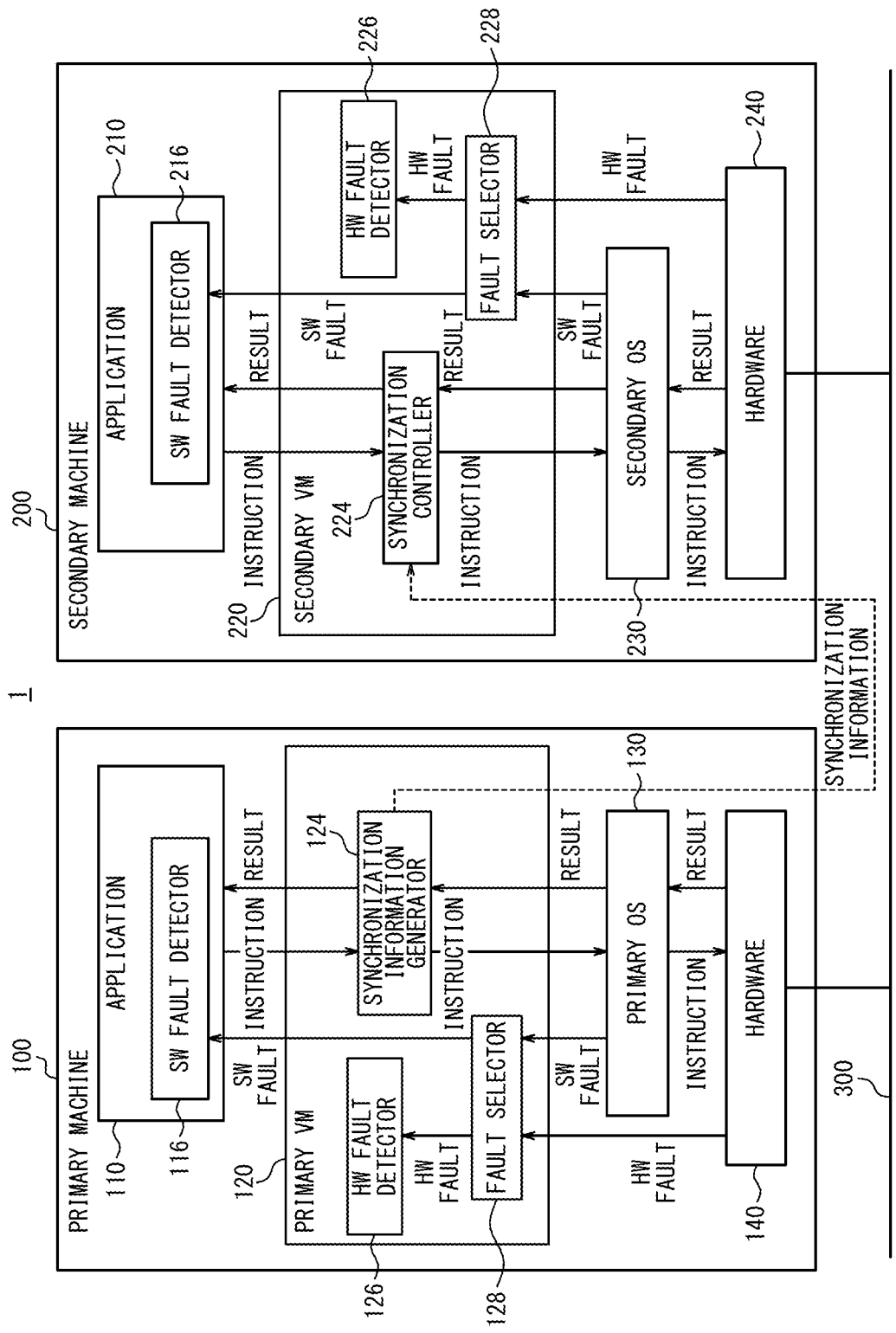
FIG. 2 is a block diagram illustrating an example configuration of a fault-tolerant system according to an embodiment.

As illustrated in FIG. 2, the fault-tolerant system 1 according to an embodiment of the present disclosure includes the primary machine 100 and a secondary machine 200. The primary machine 100 and the secondary machine 200 are communicatively connected via the network 300. The primary machine 100 and the secondary machine 200 both execute the same processing. When a fault has occurred in the primary machine 100, the secondary machine 200 takes over processing. In this way, processing continues for the fault-tolerant system 1 overall.

Example Configuration

The primary machine 100 includes hardware 140 and runs a primary OS 130 on the hardware 140. The primary machine 100 runs a primary virtual machine (VM) 120 on the primary OS 130. The primary machine 100 runs an application 110 on the primary VM 120. The application 110 includes a SW fault detector 116.

The secondary machine 200 includes hardware 240 and runs a secondary OS 230 on the hardware 240. The secondary machine 200 runs a secondary virtual machine (VM) 220 on the secondary OS 230. The secondary machine 200 runs an application 210 on the secondary VM 220. The application 210 includes a SW fault detector 216.

The primary machine 100 and the secondary machine 200 run the application 110 and the application 210 so that the processing of the application 110 and the application 210 is the same processing. In this way, when a fault has occurred in the primary machine 100, the secondary machine 200 is able to take over processing. When not distinguishing between the application 110 and the application 210, each may be referred to simply as an application.

The hardware 140 includes a CPU, memory, and NIC. The hardware 240 includes a CPU, memory, and NIC. When not distinguishing between the hardware 140 and the hardware 240, each may be referred to simply as hardware.

Each CPU may be configured as one or more processors. Each processor may realize various functions by executing a defined program. Each processor may retrieve a program from memory or from the network 300.

The memory may be configured as a semiconductor memory, for example, and may be configured as a storage medium such as a magnetic disk. The memory may function as work memory of the CPU. The memory may be included in the CPU.

The NIC may include a LAN or other communication interface.

The primary VM 120 includes a synchronization information generator 124, a HW fault detector 126, and a fault selector 128. The synchronization information generator 124 generates synchronization information to communicate the execution status of the application 110 in the primary VM 120 to the secondary VM 220. The HW fault detector 126 detects a hardware fault (HW fault) occurring in the primary machine 100. The fault selector 128 outputs information relating to a hardware fault occurring in the hardware 140 to the HW fault detector 126, and information relating to a software fault (SW fault) occurring in the primary OS 130 to the application 110.

The secondary VM 220 includes a synchronization controller 224, a HW fault detector 226, and a fault selector 228. The synchronization controller 224 receives synchronization information from the primary VM 120 and executes the application 210 in synchronization with the execution status of the application 110 in the primary VM 120.

Example Application Operation

The primary VM 120 runs on the primary OS 130. The secondary VM 220 runs on the secondary OS 230. The primary VM 120 and the secondary VM 220 may be collectively referred to as VM. The primary OS 130 and the secondary OS 230 may be collectively referred to as OS. In other words, a VM runs on an OS. Functions of the OS and the VM are realized by hardware, including a CPU.

The primary OS 130 causes the primary VM 120 to execute the processing of the application 110. The secondary OS 230 causes the secondary VM 220 to execute the processing of the application 210. In other words, the OS causes the VM to execute the processing of the application 110 and the application 210.

An example of the flow of operations when an application executes an instruction until an operation result is obtained is described below. In the primary machine 100, the application 110 outputs the instruction to the primary VM 120. The primary OS 130 running the primary VM 120 receives the instruction from the primary VM 120. The primary OS 130 converts the received instruction into a format that is executable by the hardware 140, causes the hardware 140 to execute the instruction, and obtains an operation result of the hardware 140 operation. The primary VM 120 outputs the operation result obtained by the primary OS 130 to the application 110. The above operations allow the application 110 to obtain the operation result according to the instruction.

In the primary machine 100, the synchronization information generator 124 of the primary VM 120 generates synchronization information including the instruction and the operation result and outputs to the synchronization controller 224 of the secondary machine 200. In the secondary machine 200, the application 210 outputs the instruction to the secondary VM 220 based on the synchronization information obtained by the synchronization controller 224. The secondary OS 230 running the secondary VM 220 receives the instruction from the secondary VM 220. The secondary OS 230 converts the received instruction into a format that is executable by the hardware 240, causes the hardware 240 to execute the instruction, and obtains an operation result of the hardware 240 operation. The secondary VM 220 outputs the operation result obtained by the secondary OS 230 to the application 210. The above operations allow the application 210 in the secondary machine 200 to execute the same instruction as the application 110 in the primary machine 100, based on synchronization information, and obtain the operation result.

VM may also be referred to as runtime in programming languages such as Java® (Java is a registered trademark in Japan, other countries, or both), .NET, and the like. The VM may be realized as a general-purpose programming language processor. A general-purpose programming language processor may include, for example, mruby, MicroPython, and the like. mruby is a lightweight Ruby language processor for embedded systems that may be run in memory-saving environments. The Ruby processing system is implemented primarily as an interpreter. Source code is compiled into bytecode at or before program execution. The interpreter executes bytecode one instruction at a time.

The primary VM 120 and the secondary VM 220 store each bytecode at the same instruction address. The primary VM 120 and secondary VM 220 obtain bytecode from the same instruction address and execute operations corresponding to the bytecode. Executing an operation corresponding to bytecode may also be referred to as executing bytecode. The primary VM 120 may cause the synchronization information generator 124 to execute bytecode. The secondary VM 220 may cause the synchronization controller 224 to execute bytecode. The primary VM 120 and the secondary VM 220 are synchronized each time an operation corresponding to a single bytecode is executed. The primary VM 120 and the secondary VM 220 execute an operation corresponding to one bytecode, synchronize, and then execute an operation corresponding to the next bytecode. In this way, the primary VM 120 and the secondary VM 220 are able to synchronize with each other while proceeding with processing.

When the bytecode corresponds to an operation of obtaining data input from outside or outputting data externally, only the primary VM 120 actually performs the external data input or output. In contrast, the secondary VM 220 does not actually perform external data input or output.

When the bytecode corresponds to an operation of obtaining data input from outside, the secondary VM 220 acquires the data input to the primary VM 120 from the primary VM 120, instead of acquiring the data input from outside. When the bytecode corresponds to an operation outputting data externally, the secondary VM 220 skips execution of the bytecode.

The primary VM 120 sends synchronization information to the secondary VM 220 every time the primary VM 120 executes one bytecode. Synchronization information may include the instruction address where the bytecode is stored, and may include data input from outside to the primary VM 120. Synchronization information may include information indicating an instruction number executed. The synchronization information may include information identifying the bytecode executed by the primary VM 120.

The secondary VM 220 receives synchronization information from the primary VM 120 and proceeds to process the bytecode based on the synchronization information. The secondary VM 220 proceeds to process the bytecode mapped to the instruction address received from the primary VM 120 or the instruction number executed. After the secondary VM 220 finishes processing one bytecode, the secondary VM 220 suspends processing until the next synchronization information from the primary VM 120 is received.

The primary VM 120 and the secondary VM 220 are able to proceed with bytecode processing synchronously by sending and receiving synchronization information as described above.

In order to save memory for implementing the VM, mruby simplifies processing and reduces the VM program size. One function to simplify processing is single threading of program processing. Single threading means that multiple instructions are not executed in parallel at the same time and that the system is configured so that processing is not interrupted by external interrupts. Processing not being interrupted by external interrupts eliminates the need for complex timing adjustment functions. As a result, processing is simplified.

Here, even when no external interrupt occurs at the VM level, an external interrupt may occur at the OS level. Therefore, an external interrupt may occur while executing bytecode in the VM. However, an external interrupt does not change the result of bytecode execution.

The synchronization information generator 124 of the primary VM 120 obtains the instruction address or the executed instruction number of the executed bytecode as the bytecode is executed in the primary VM 120. When data is input from outside to the primary VM 120, the synchronization information generator 124 obtains the data input. The synchronization information generator 124 generates synchronization information including the obtained instruction address or the executed instruction number or the data input from outside, and outputs to the secondary VM 220. An instruction to obtain data input from outside may also be referred to as an input instruction. The synchronization information generator 124 outputs data input from outside as synchronization information by executing an input instruction as bytecode.

After sending synchronization information to the secondary VM 220, the synchronization information generator 124 does not allow the primary VM 120 to execute the next bytecode until a response notification is received from the secondary VM 220. In other words, the synchronization information generator 124 permits the primary VM 120 to execute the next bytecode on receiving a response notification from the secondary VM 220.

The synchronization controller 224 of the secondary VM 220 receives synchronization information from the synchronization information generator 124 of the primary VM 120. The synchronization controller 224 controls bytecode execution in the secondary VM 220 based on the received synchronization information. For example, the synchronization controller 224 may cause the secondary VM 220 to execute the bytecode stored at the instruction address included in the synchronization information. The synchronization controller 224 may cause the secondary VM 220 to execute bytecode mapped to the executed instruction number included in the synchronization information.

When the bytecode to be executed next in the secondary VM 220 corresponds to an operation to obtain data input from outside, the synchronization controller 224 causes the secondary VM 220 to skip execution of the bytecode. In such a case, the synchronization information includes data input from outside. The secondary VM 220 considers the data input from outside included in the synchronization information as data obtained as a result of the execution of the skipped bytecode and proceeds to process the next bytecode. By including data input from outside in the synchronization information, the secondary machine 200 does not have to communicate externally. In this way, the load on the fault-tolerant system 1 is reduced. The result is the fault-tolerant system 1 operable at a low load.

Example Program

Here, an mruby program that obtains a string from outside, concatenates the obtained string with another string, and outputs the concatenated string outside is described as an example. The two strings are here represented as X and Y. The program may be compiled into the following four bytecodes Codes A. B, C, and D each correspond to one instruction.

Code A: the VM assigns a string constant "X" to a first register.

Code B: the VM obtains a string as data from outside and assigns the string to a second register. In the present program example, "Y" is obtained as a string.

Code C: the VM concatenates the string in the first register with the string in the second register and assigns the concatenated string to the first register.

Code D: the VM outputs the string of the first register externally.

A configuration in which the primary machine 100 and the secondary machine 200 execute the bytecodes described above while synchronizing is described below.

The primary machine 100 and the secondary machine 200 are communicatively connected to an external device via the network 300. The primary machine 100 obtains input data from the external device. The primary machine 100 outputs output data to the external device. The primary machine 100 sends synchronization information to the secondary machine 200. When the primary machine 100 obtains input data from the external device, the primary machine 100 outputs synchronization information including the input data to the secondary machine 200.

When a fault has occurred in the primary machine 100, the secondary machine 200 is able to continue to execute the bytecode. Although the secondary machine 200 does not communicate with the external device while the primary machine 100 is running, the secondary machine is able to communicate with the external device to input and output data when the primary machine 100 stops due to a fault.

Figure 3:
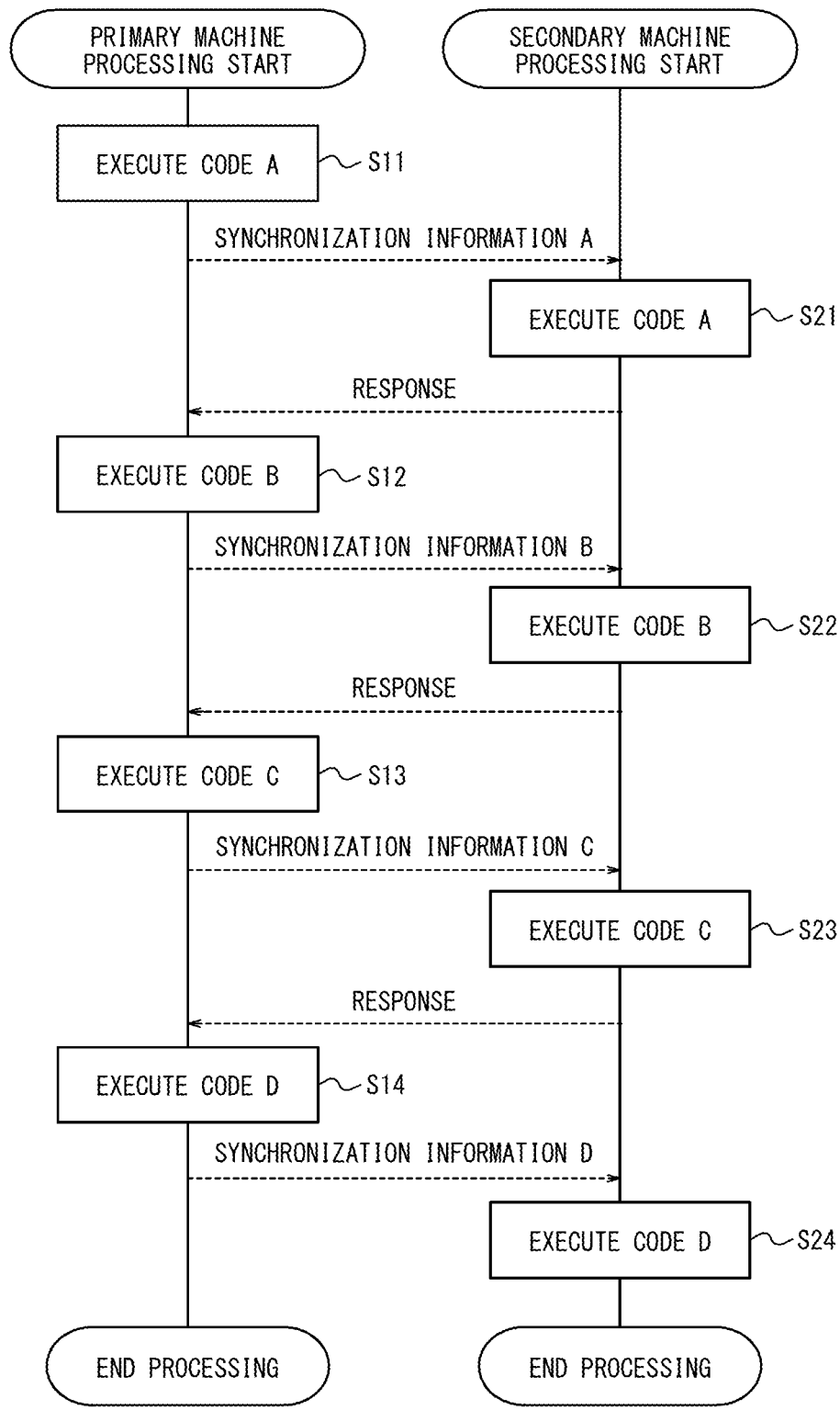
FIG. 3 is a flowchart illustrating example procedures of executing bytecode.

The primary VM 120 and secondary VM 220 execute the bytecode described above in the procedures illustrated in FIG. 3.

The primary VM 120 executes the code A (step S11). The primary VM 120 assigns the string constant "X" to the first register as an operation corresponding to the code A. The primary VM 120 sends synchronization information A to the secondary VM 220 after executing the code A in the procedure of step S11. The string constant "X" is not included in the synchronization information A due to being included in the code A.

On receiving the synchronization information A from the primary VM 120, the secondary VM 220 executes the code A based on the synchronization information A (step S21). The secondary VM 220 assigns the string constant "X" to the first register as an operation corresponding to the code A. After executing the code A in the procedure of step S21, the secondary VM 220 sends a response to the primary VM 120 indicating that the execution of the code A has been completed.

On receiving the response from the secondary VM 220, the primary VM 120 executes the next bytecode, the code B (step S12). The primary VM 120 obtains the string "Y" as input data from the external device and assigns the string to the second register, as an operation corresponding to the code B. After executing the code B in step S12, the primary VM 120 sends synchronization information B including the string "Y", which is input data from the external device, to the secondary VM 220.

On receiving the synchronization information B from the primary VM 120, the secondary VM 220 executes the code B based on the synchronization information B (step S22). The secondary VM 220 assigns the string "Y" included in the synchronization information B to the second register instead of obtaining input data from the external device, as an operation corresponding to the code B. After executing the code B in the procedure of step S22, the secondary VM 220 sends a response to the primary VM 120 indicating that the execution of the code B has been completed.

On receiving the response from the secondary VM 220, the primary VM 120 executes the next bytecode, the code C (step S13). The primary VM 120 concatenates the string in the first register with the string in the second register and assigns the concatenated string to the first register, as an operation corresponding to the code C. In this case, the string assigned to the first register is "XY". The primary VM 120 sends synchronization information C to the secondary VM 220 after executing the code C in the procedure of step S13.

On receiving the synchronization information C from the primary VM 120, the secondary VM 220 executes the code C based on the synchronization information C (step S23). The secondary VM 220 concatenates the string in the first register with the string in the second register and assigns the concatenated string to the first register as an operation corresponding to the code C. In this case, the string assigned to the first register is "XY" in the secondary VM 220 as well. After executing the code C in the procedure of step S23, the secondary VM 220 sends a response to the primary VM 120 indicating that the execution of the code C has been completed.

On receiving the response from the secondary VM 220, the primary VM 120 executes the next bytecode, the code D (step S14). The primary VM 120 outputs the string of the first register to the external device as an operation corresponding to the code D. In this case, the string that the external device obtains is "XY". The primary VM 120 sends synchronization information D to the secondary VM 220 after executing the code D in the procedure of step S14.

On receiving the synchronization information D from the primary VM 120, the secondary VM 220 executes the code D based on the synchronization information D (step S24). The secondary VM 220 does not output the first register string to the external device and does not execute anything, as an operation corresponding to the code D. In other words, the secondary VM 220 skips the operation corresponding to the code D. After skipping the corresponding operation as the execution of code D in the procedure of step S24, the secondary VM 220 sends a response to the primary VM 120 indicating that the execution of the code D has been completed.

After the secondary VM 220 sends the response to the primary VM 120 indicating that the execution of the code D has been completed, the secondary VM 220 ends the execution of the bytecode series. The primary VM 120 ends the execution of the bytecode series by receiving the response from the secondary VM 220.

As explained above, the primary VM 120 and secondary VM 220 are able to execute bytecode in synchronization with each other. When the primary VM 120 stops due to a fault in the middle of executing a bytecode series, the secondary VM 220 is able to continue to execute the bytecode. The secondary machine 200 is also able to continue to execute bytecode corresponding to operations of inputting and outputting data by being communicatively connected to an external device via the network 300.

In the fault-tolerant system 1, processing redundancy is achieved when both the primary machine 100 and the secondary machine 200 are operating normally. Operations of the fault-tolerant system 1 in a case where the primary machine 100 or the secondary machine 200 stops due to a fault is described here.

<Primary Machine 100 Fault Occurrence>

When a fault has occurred in the primary machine 100, the primary VM 120 might not be able to successfully execute a control process such as bytecode execution. Here, when the fault occurring in the primary machine 100 is a hardware fault, the same hardware fault occurring in the secondary machine 200 is unlikely. Thus, the fault-tolerant system 1 is able to avoid a fault in the primary machine 100 and continue to operate overall by switching control to the secondary machine 200.

On the other hand, when the fault that has occurred in the primary machine 100 is a software fault, the same software fault is likely to occur in the secondary machine 200, because the secondary machine 200 is executing the same processing as the primary machine 100. Therefore, the fault-tolerant system 1 may be unable to avoid a fault even when control is switched to the secondary machine 200. Therefore, the fault-tolerant system 1 operates differently when a hardware fault has occurred than when a software fault has occurred.

In the primary machine 100, the primary VM 120 receives information relating to a hardware fault that occurred in the hardware 140 and a software fault that occurred in the primary OS 130. Information relating to hardware faults and software faults may also be collectively referred to as fault information.

The fault selector 128 of the primary VM 120 determines the type of fault information received. The fault selector 128 may determine whether the fault information received is information relating to a hardware fault or a software fault. On determining that the fault information received is information related to a software fault, the fault selector 128 outputs the information related to the software fault to the application 110. Therefore, the primary VM 120 outputs an operation result of executing an instruction together with the information related to the software fault to the application 110. The application 110 detects the information related to the software fault via the SW fault detector 116. The application 110 responds to a software fault by error handling. The primary VM 120 may determine that error handling is to be executed by the application 110. The primary VM 120 may instruct the application 110 to execute error handling. The primary VM 120 may execute at least one of the following: determining that error handling is to be executed by the application 110 and instructing the application 110 to execute error handling.

On determining that the fault information received is information related to a hardware fault, the fault selector 128 outputs the fault information to the HW fault detector 126. The HW fault detector 126 detects occurrence of a hardware fault. When a hardware fault is detected, the fault-tolerant system 1 switches control processing such as bytecode execution from the primary VM 120 of the primary machine 100 to the secondary VM 220 of the secondary machine 200. The fault-tolerant system 1 enters a single operation state in which only the secondary machine 200 is operating. In the single operation state, the secondary VM 220, which replaces the operation of the primary VM 120, stops the synchronization processing with the primary VM 120.

When the primary VM 120 is able to detect a hardware fault in the primary machine 100, the primary VM 120 stops or reboots the primary machine 100 while attempting to send a fault notification to the secondary VM 220. The fault notification may be sent over the same communication path as the synchronization information. When the primary VM 120 is able to send a fault notification to the secondary VM 220, the secondary VM 220 ascertains that a hardware fault has occurred in the primary machine 100 by receiving the fault notification from the primary VM 120. When the primary VM 120 fails to send a fault notification to the secondary VM 220, the secondary VM 220 may ascertain that a fault has occurred in the primary machine 100 by monitoring the primary machine 100. When the secondary VM 220 ascertains that a fault has occurred in the primary machine 100, the secondary VM 220 takes over control processing such as bytecode execution from the primary VM 120 and stops synchronization processing with the primary machine 100. The secondary VM 220 also performs external data input and output processing on behalf of the primary VM 120, via the secondary OS 230.

The primary machine 100 may stop without sending a fault notification to the secondary VM 220 when the primary VM 120 is unable to detect a fault. The secondary VM 220 may ascertain that the primary machine 100 has stopped and may ascertain that a fault has occurred in the primary machine 100 by monitoring the primary machine 100. When the secondary VM 220 ascertains that a fault has occurred in the primary machine 100, the secondary VM 220 takes over control processing such as bytecode execution from the primary VM 120 and stops synchronization processing with the primary machine 100. As described above, the primary VM 120 changes operation depending on the result of the determination of the type of fault information.

<Secondary Machine 200 Fault Occurrence>

In the secondary machine 200, the secondary VM 220 receives information relating to a hardware fault that occurred in the hardware 240 and a software fault that occurred in the secondary OS 230. The fault selector 228 of the secondary VM 220 determines whether the fault information received is information relating to a hardware fault or a software fault. On determining that the fault information received is information related to a software fault, the fault selector 228 outputs the information related to the software fault to the application 210. Therefore, the primary VM 220 outputs an operation result of executing an instruction together with the information related to the software fault to the application 210. The application 210 detects the information related to the software fault via the SW fault detector 216. The application 210 responds to a software fault by error handling.

On determining that the fault information received is information related to a hardware fault, the fault selector 228 outputs the fault information to the HW fault detector 226. The HW fault detector 226 detects the occurrence of a hardware fault. When a hardware fault has occurred in the secondary machine 200, the fault-tolerant system 1 enters a single operation state in which only the primary machine 100 is operating. In the single operation state, the primary VM 120 stops the synchronization processing with the secondary VM 220.

When the secondary VM 220 is able to detect a hardware fault in the secondary machine 200, the secondary VM 220 stops or reboots the secondary machine 200 while attempting to send a fault notification to the primary VM 120. The fault notification may be sent over the same communication path as the synchronization information. When the secondary VM 220 is able to send a fault notification to the primary VM 120, the primary VM 120 ascertains that a fault has occurred in the secondary machine 200 by receiving the fault notification from the secondary VM 220. When the secondary VM 220 fails to send a fault notification to the primary VM 120, the primary VM 120 may ascertain that a fault has occurred in the secondary machine 200 by monitoring the secondary machine 200. When the primary VM 120 ascertains that a fault has occurred in the secondary machine 200, the primary VM 120 stops synchronization processing with the secondary machine 200 in control processing such as bytecode execution. The primary VM 120 may stop the synchronization processing by stopping the operation of the synchronization information generator 124.

The secondary machine 200 may stop without sending a fault notification to the primary VM 120 when the secondary VM 220 is unable to detect a fault. The primary VM 120 may ascertain that the secondary machine 200 has stopped and may ascertain that a fault has occurred in the secondary machine 200 by monitoring the secondary machine 200. When the primary VM 120 ascertains that a fault has occurred in the secondary machine 200, the primary VM 120 stops synchronization processing with the secondary machine 200.

The means by which the primary VM 120 monitors the secondary machine 200 or the means by which the secondary VM 220 monitors the primary machine 100 may be implemented, for example, as follows.

For example, the primary VM 120 and the secondary VM 220 may perform periodic communication with each other for health monitoring such as heartbeat monitoring. The primary VM 120 may determine that a fault has occurred in the secondary machine 200 when there is no response from the secondary VM 220. The secondary VM 220 may determine that a fault has occurred in the primary machine 100 when there is no response from the primary VM 120. The secondary VM 220 may determine that no fault has occurred in the primary machine 100 by receiving synchronization information from the primary VM 120 in the synchronization processing. The primary VM 120 may determine that no fault has occurred in the secondary machine 200 by receiving a response from the secondary VM 220 in the synchronization processing.

For example, a third machine, different from the primary machine 100 and secondary machine 200, may monitor the operations of the primary machine 100 and the secondary machine 200. The third machine may notify the secondary VM 220 of a fault that has occurred in the primary machine 100, or the primary VM 120 of a fault that has occurred in the secondary machine 200. The third machine may perform periodic communication with the primary VM 120 and secondary VM 220 for health monitoring such as heartbeat monitoring.

The primary VM 120 and the secondary VM 220 may incorrectly determine that a fault has occurred in the primary machine 100 and the secondary machine 200 due to a network fault that disrupts communication for health monitoring. To avoid false detection of faults in the primary machine 100 and the secondary machine 200 due to a network fault, the communication path for the health monitoring may be multiplexed.

Example Fault Selector Operation

When the fault selector obtains information related to a fault, the fault selector may determine whether the fault is a hardware fault or a software fault based on a return value of a system call, for example.

When the return value of the system call is an error, the fault selector may determine whether the fault is a hardware fault or a software fault based on the content of the error. For example, the fault selector may determine that the fault is a hardware fault when the content of the error indicates a hardware failure in storage, memory, CPU, NIC, and the like. The fault selector may determine that the fault is a software fault when, for example, the content of the error indicates a communication connection failure or transmission/reception failure, lack of memory, non-existence of a file as a target of an operation by the application, and the like. Further, the fault selector may determine that a synchronization communication error, in which synchronization information cannot be received due to a communication timeout, is a hardware fault.

The fault selector may compare an execution result of an instruction in the primary machine 100 with an execution result of the instruction in the secondary machine 200, based on synchronization information, even when the primary machine 100 or the secondary machine 200 does not detect a fault by itself. The fault selector may determine that a software fault or a hardware fault has occurred in either the primary machine 100 or the secondary machine 200 when the execution result of the instruction in the primary machine 100 does not match the execution result of the instruction in the secondary machine 200.

The fault selector may determine a degree of certainty of the determination when determining whether a fault is a hardware fault or a software fault. For example, the fault selector may determine with a high degree of certainty that a synchronization communication error, in which synchronization information cannot be received due to a communication timeout, is a hardware fault. For example, the fault selector may determine with a low degree of certainty that a fault has occurred when an execution result of an instruction in the primary machine 100 does not match an execution result of the instruction in the secondary machine 200.

The primary VM 120 may determine whether to switch control to the secondary machine 200 and stop or reboot the primary machine 100 based on the degree of certainty of the determination of whether a fault is a hardware fault or a software fault. For example, on determining with a high degree of certainty that a fault is a hardware fault, the primary VM 120 may switch control to the secondary machine 200 and stop or reboot the primary machine 100. On determining with a high degree of certainty that a fault is a software fault, the primary VM 120 may determine that error handling is to be executed by the application 110. The primary VM 120 may instruct the application 110 to execute error handling. The primary VM 120 may execute at least one of the following: determining that error handling is to be executed by the application 110 and instructing the application 110 to execute error handling. On determining with a low degree of certainty that a fault is a hardware fault or a software fault, the primary VM 120 may determine whether to stop or reboot the primary machine 100 after attempting to handle the error with the application 110. By determining the operation based on the degree of certainty of the determination, the accuracy of the determination to switch control is improved.

The fault selector may determine whether a fault is a hardware fault or a software fault based on a list identifying whether a return value of a system call corresponds to a hardware fault or a software fault. The fault selector may determine whether a fault is a hardware fault or a software fault based on a list identifying whether the error content of the system call corresponds to a hardware fault or a software fault. In a list, a return value or an error content and the degree of certainty of mapping to the type of fault may be associated. The fault selector may determine the degree of certainty of a determination based on a list. By determining the type of fault based on a list, the fault selector is able to easily determine the type of fault.

For example, when an error X of a system call A is mapped to a software fault in a list, the fault selector may determine that a fault is a software fault on obtaining the error X as error content of the system call A. When an error Y of the system call A is mapped to a hardware fault in the list, the fault selector may determine that a fault is a hardware fault on obtaining the error Y as error content of the system call A. When a system call B exists in addition to the system call A, the fault selector may determine whether a return value or error content of the system call B corresponds to a hardware fault or a software fault based on a list for the system call B.

Example Flowchart

An example of operations of the fault-tolerant system 1 when a fault has occurred in the primary machine 100 is described here. The primary VM 120 may execute a control method that includes, for example, the example flowchart procedures illustrated in FIG. 4. The control method may be realized as a control program to be executed by a processor that implements the functions of the primary VM 120. The control program may be stored on a non-transitory computer-readable storage medium.

The primary VM 120 determines whether the primary VM 120 has detected the occurrence of a hardware fault (HW fault) in the primary machine 100 (step S31). When the primary VM 120 does not detect the occurrence of a hardware fault (step S31: NO), processing proceeds to step S34. When the primary VM 120 detects the occurrence of a hardware fault (step S31: YES), the primary VM 120 sends a fault notification to the secondary VM 220 that a hardware fault has occurred in the primary machine 100 (step S32). The primary VM 120 stops or reboots the primary machine 100 (step S33). After execution of the procedure in step S33, the primary VM 120 ends execution of the procedures of the flowchart in FIG. 4.

When the primary VM 120 does not detect the occurrence of a hardware fault (step S31: NO), the primary VM 120 determines whether a software fault is detected (step S34). When the primary VM 120 does not detect the occurrence of a software fault (step S34: NO), the primary VM 120 ends execution of the procedures of the flowchart in FIG. 4. When the primary VM 120 detects the occurrence of a software fault (step S34: YES), the primary VM 120 executes error processing for the application 110 according to the software fault (step S35). The primary VM 120 may determine that error handling is to be executed by the application 110. The primary VM 120 may instruct the application 110 to execute error handling. The primary VM 120 may execute at least one of the following: determining that error handling is to be executed by the application 110 and instructing the application 110 to execute error handling. After execution of the procedure in step S35, the primary VM 120 ends execution of the procedures of the flowchart in FIG. 4.

Figure 4:
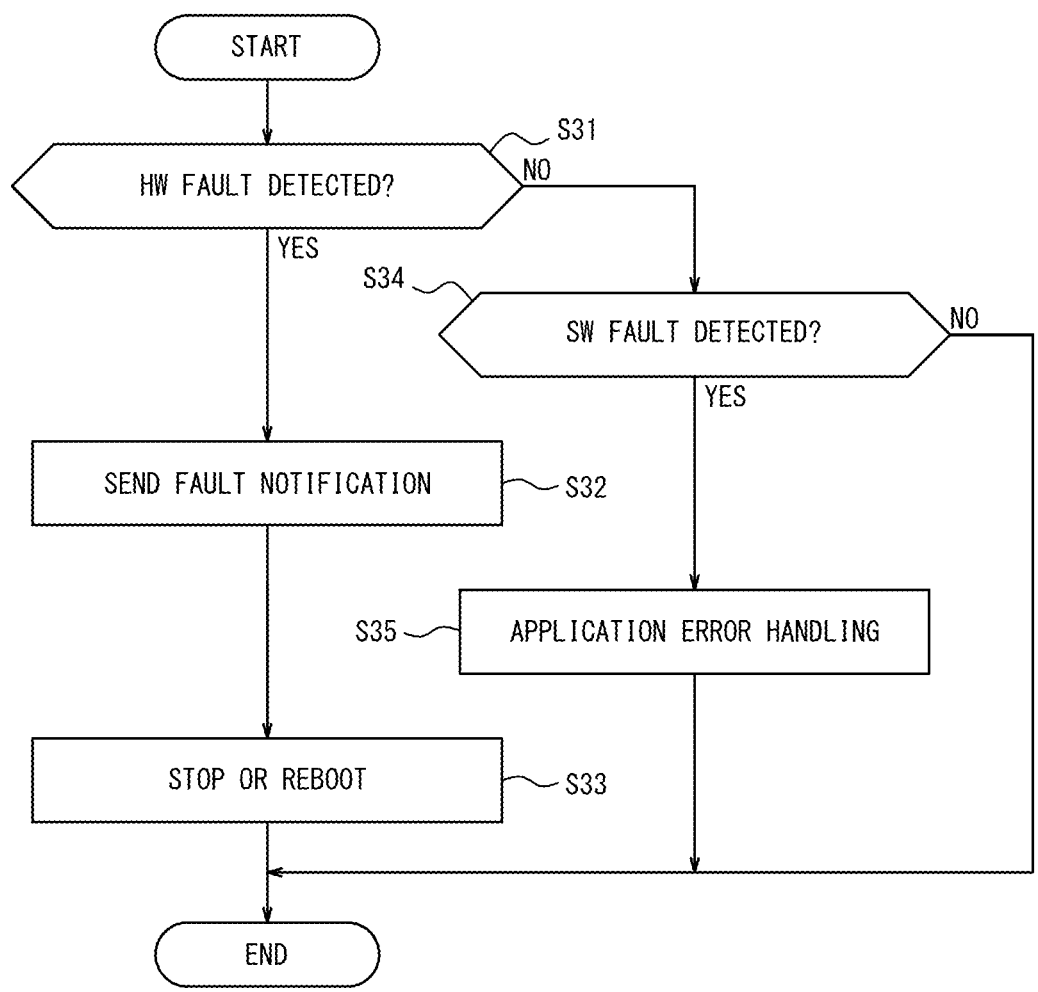
FIG. 4 is a flowchart illustrating example procedures of a control method according to an embodiment.

In the fault-tolerant system 1, the primary VM 120 is able to change behavior based on the results of determining the type of fault by executing the flowchart procedure illustrated in FIG. 4. Further, when a fault that has occurred in the primary machine for which an appropriate response is error handling, the primary VM 120 is able to avoid switching control to the secondary machine 200.

Summary

As described above, the primary machine 100 according to an embodiment of the present disclosure changes operation based on a result of determination of the type of fault. Further, the fault-tolerant system 1 according to an embodiment of the present disclosure determines whether a fault is a hardware fault or a software fault and determines whether to switch control from the primary machine 100 to the secondary machine 200. In this way, unnecessary control switching is avoided when, for example, an error has occurred that is not resolved by switching control.

In the fault-tolerant system 1 according to an embodiment of the present disclosure, the primary VM 120 may execute error processing when the fault information relates to a software fault. In this way, a fault is resolved without switching control. As a result, unnecessary control switching is avoided.

The above description of embodiments according to the present disclosure is provided with reference to the drawings. Specific configurations are not limited to the embodiments described, and various modifications are included without departing from the scope of the present disclosure.

The invention claimed is:

1. A fault-tolerant system comprising:
a primary machine including a primary virtual machine, the primary virtual machine including a synchronization information generator configured to generate and output synchronization information based on an instruction and a result of execution of the instruction, and a fault selector configured to determine a type of fault information generated when the instruction was executed, wherein
the primary virtual machine changes operation based on a result of the determination of the type of fault information; and
a secondary machine including a secondary virtual machine configured to execute the instruction based on the synchronization information and send a response to the primary virtual machine indicating that execution of the instruction has been completed, wherein
the primary virtual machine executes next instruction when receiving the response from the secondary virtual machine.

2. The fault-tolerant system according to claim 1, wherein the fault selector determines whether the fault information relates to a hardware fault or a software fault, wherein when the fault information relates to a software fault, the primary virtual machine executes at least one of determining that error handling is to be executed by an application running on the primary virtual machine and instructing the application to execute the error handling.

3. The fault-tolerant system according to claim 2, wherein the fault selector determines a hardware fault when synchronization information cannot be received due to a communication timeout.

4. The fault-tolerant system according to claim 3, wherein the fault selector determines whether the fault information relates to a hardware fault or a software fault, wherein the primary virtual machine switches control to the secondary virtual machine when the fault information is determined to be information relating to a hardware fault, and does not switch control to the secondary virtual machine when the fault information is determined to be information relating to a software fault.

5. The fault-tolerant system according to claim 3, wherein the primary virtual machine and the secondary virtual machine perform periodic communication with each other for health monitoring.

6. The fault-tolerant system according to claim 2, wherein the fault selector obtains a return value or error content of a system call as the fault information, and determines whether the fault information relates to a hardware fault or a software fault based on a list that identifies whether the return value or error content of the system call corresponds to a hardware fault or a software fault.

7. The fault-tolerant system according to claim 6, wherein the fault selector determines whether the fault information relates to a hardware fault or a software fault, wherein the primary virtual machine switches control to the secondary virtual machine when the fault information is determined to be information relating to a hardware fault, and does not switch control to the secondary virtual machine when the fault information is determined to be information relating to a software fault.

8. The fault-tolerant system according to claim 7, wherein the fault selector determines the hardware fault when synchronization information cannot be received due to a communication timeout.

9. The fault-tolerant system according to claim 6, wherein the primary virtual machine and the secondary virtual machine perform periodic communication with each other for health monitoring.

10. The fault-tolerant system according to claim 2, wherein the fault selector determines whether the fault information relates to a hardware fault or a software fault, wherein the primary virtual machine switches control to the secondary virtual machine when the fault information is determined to be information relating to a hardware fault, and does not switch control to the secondary virtual machine when the fault information is determined to be information relating to a software fault.

11. The fault-tolerant system according to claim 10, wherein the fault selector determines the hardware fault when synchronization information cannot be received due to a communication timeout.

12. The fault-tolerant system according to claim 2, wherein the primary virtual machine and the secondary virtual machine perform periodic communication with each other for health monitoring.

13. The fault-tolerant system according to claim 1, wherein the fault selector determines whether the fault information relates to a hardware fault or a software fault, wherein the primary virtual machine switches control to the secondary virtual machine when the fault information is determined to be information relating to a hardware fault, and does not switch control to the secondary virtual machine when the fault information is determined to be information relating to a software fault.

14. The fault-tolerant system according to claim 13, wherein the fault selector determines the hardware fault when synchronization information cannot be received due to a communication timeout.

15. The fault-tolerant system according to claim 1, wherein the primary virtual machine and the secondary virtual machine perform periodic communication with each other for health monitoring.

* * * * *